United States Patent
Kim et al.

(10) Patent No.: US 7,188,099 B2
(45) Date of Patent: Mar. 6, 2007

(54) TEXTURE-BASED IMAGE DATABASE BROWSING AND SORTING METHOD

(75) Inventors: Kyu Heon Kim, Taejon (KR); Se Yoon Jeong, Taejon (KR); Jae Yeon Lee, Taejon (KR); Young Lae Bae, Taejon (KR); Byung Tea Chun, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 549 days.

(21) Appl. No.: 09/995,738

(22) Filed: Nov. 29, 2001

(65) Prior Publication Data
US 2002/0133489 A1 Sep. 19, 2002

(30) Foreign Application Priority Data
Mar. 14, 2001 (KR) ................. 2001-13209

(51) Int. Cl.
*G06F 17/30* (2006.01)
(52) U.S. Cl. ................. 707/3; 707/7; 707/101; 707/102; 382/192; 382/195; 382/207; 382/209; 382/224
(58) Field of Classification Search .............. 707/1, 707/2, 3, 4, 5, 6, 7; 382/224, 225, 162
See application file for complete search history.

(56) References Cited

U.S. PATENT DOCUMENTS

| | | | | |
|---|---|---|---|---|
| 5,767,978 A | * | 6/1998 | Revankar et al. | ........... 382/224 |
| 5,933,823 A | * | 8/1999 | Cullen et al. | .................. 707/6 |
| 6,167,396 A | * | 12/2000 | Lokken | .......................... 707/3 |
| 6,192,150 B1 | * | 2/2001 | Leow et al. | .................... 707/2 |
| 6,434,261 B1 | * | 8/2002 | Zhang et al. | ............... 382/132 |
| 6,584,236 B1 | * | 6/2003 | Maruo et al. | ............... 382/298 |
| 6,704,448 B1 | * | 3/2004 | Hasegawa | .................... 382/173 |
| 2001/0046321 A1 | * | 11/2001 | Murakawa | .................. 382/190 |
| 2002/0039438 A1 | * | 4/2002 | Mori et al. | ................. 382/154 |

OTHER PUBLICATIONS

Azencott et al., Texture Classification using . . , Analysis and Machine Intelligence, vol. 19, No. 2, Feb. 1997.
Manjunath et al., Texture Features for . . , IEEE Transactions on Pattern Analysis and Machine Intel., vol. 18, No. 8, Aug. 1996.

* cited by examiner

*Primary Examiner*—Hosain Alam
*Assistant Examiner*—Isaac Woo
(74) *Attorney, Agent, or Firm*—Mayer, Brown, Rowe & Maw LLP

(57) ABSTRACT

A texture-based image database browsing and sorting method computes the number of edge pixels of objects in static images, measures textures of the static images by numerating the number of edge pixels thereof and measures a texture of a query image by numerating the number of edge pixels of an object in the query image. Then, the method sorts the measured textures according to a sorting order and searches a texture close to the texture of the query image among the sorted textures.

1 Claim, 3 Drawing Sheets

TEXTURE-BASED IMAGE DATABASE BROWSING AND SORTING METHOD

FIELD OF THE INVENTION

The present invention relates to a method for browsing and sorting image database based on texture of images; and, more particularly, to a texture-based image database browsing and sorting method capable of effectively sorting and browsing a large amount of image data by using textures of static images, wherein a texture is obtained by determining the number of edge pixels of an object in the static image.

BACKGROUND OF THE INVENTION

Since existing image browsing or sorting techniques browse or sort images by using apparent characteristics of a target image, e.g., a size of image data or a generation time of the image, it is impossible to practically per-form intellectual searching or sorting by using meaningful information obtained from internal information included in each image, e.g., color or nature of the image, or an object in the image.

SUMMARY OF THE INVENTION

It is, therefore, a primary object of the present invention to provide a texture-based image database browsing and sorting method for effectively browsing or sorting images without examining individual image data by measuring texture which is obtained by computing the number of edge pixels of an object within a target static image through the use of a Sobel operator and an n-dimensional Wavelet transform using a high frequency filter.

In accordance with a preferred embodiment of the present invention, there is provided a method for sorting static images, comprising the steps of:

computing the number of edge pixels of objects in the static images and measuring textures of the static image by numerating the number of edge pixels; and sorting the measured textures according to a sorting order.

In accordance with another preferred embodiment of the present invention, there is provided a method for browsing static images in a data image texture database by using an inputted query image as a standard, comprising the steps of:

measuring a texture of the query image by numerating the number of edge pixels of an object in the query image; and searching a texture value close to the texture of the query image among the textures of the static images sorted in the data image texture database.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

First of all, before mentioning an inventive image database browsing and sorting method, there will be described the texture extracted from a target static image in accordance with the present invention.

The term "texture" represents a level of quality of an image, i.e., coarseness of an object within the image. Therefore, the image is expressed as a smooth image or a coarse image according to a usual expression. However, the meaning of the level of quality expressed as above is ambiguous and, thus, it can only express a relative image quality for two different objects, i.e., relative coarseness or relative smoothness. For instance, the image quality of two objects is expressed like an object A is coarser than an object B. This relative notion can represent a relative comparison but it cannot show a property for one object, i.e., an absolute property.

However, the present invention provides the relative notion of texture with an absolute level like cm that is a unit for measuring height to thereby measure the texture of one object. As a result, the texture introduced by the present invention becomes to absolutely represent the coarseness or smoothness of each object in an image without using a comparative object.

In accordance with the present invention, the texture is described as a digit number. That is, the texture is expressed as a number, e.g., 2.78 like the height is presented as 178 cm.

Hereinafter, with reference to the drawings, there will be explained in detail a texture-based image database browsing and sorting method in accordance with a preferred embodiment of the present invention.

Figure 1:
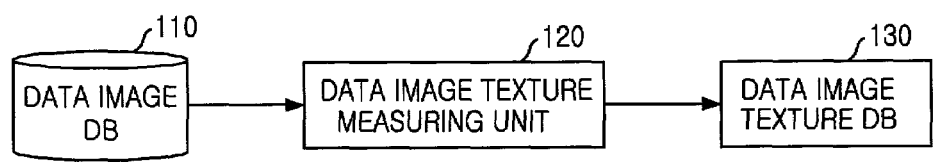
FIG. 1 shows a schematic diagram of explaining an image database sorting method in accordance with the present invention.

Referring to FIG. 1, there is shown a schematic diagram of explaining an image database sorting method in accordance with the present invention, which comprises a data image database (DB) 110, a data image texture measuring unit 120 and a data image texture database (DB) 130.

According to the image database sorting method, the data image texture measuring unit 120 measures a texture of each image stored in the data image DB 110, wherein a texture for each image (static image, hereinafter referred to as a data image or an image) is represented as a digital number obtained by computing the number of edge pixels of an object within the static image. The measured texture is stored in the data image texture DB 130 with the original image (static image). Then, the measured texture values are sorted according to a sorting order. That is, they are sorted in an order of texture values closest to the numeric value of a newly inputted. For example, if the newly inputted texture has a numeric value of 10 and the previously stored texture values are 15, 9, 7 and 20, as the sorting result, the stored texture values are arranged in an order of 9, 7, 15 and 20.

Figure 2:
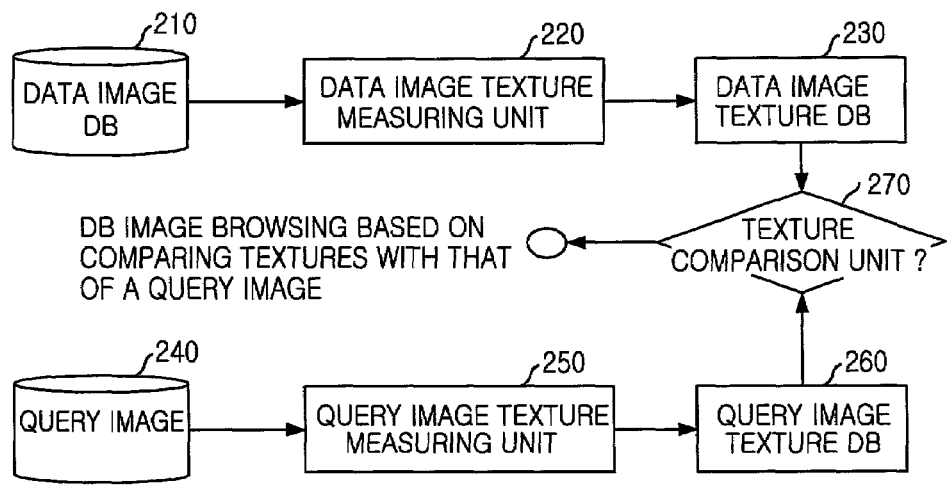
FIG. 2 illustrates a schematic diagram of showing an image database browsing method in accordance with the present invention.

Referring to FIG. 2, there is illustrated a schematic diagram of showing an image database browsing method in accordance with the present invention.

As shown in FIG. 2, the image DB browsing method further includes a step of comparing and searching a data image and a query image being a standard compared with the sorting method.

According to the sorting method described in FIG. 1, the measured texture value of each data image (static image) is sorted according to a sorting order and stored in the data image texture DB 230.

Through the use of the stored texture values, the images stored in the data image texture DB 230 can be browsed. As a result, it is possible to more rapidly browse not apparent properties but internal properties of images in a state of not checking individual image data directly.

When browsing the properties of images, the texture of the query image 240 is measured by computing the number of edge pixels of an object within the query image 240 in the same manner as described above. The measured texture of the query image 240 is stored in a query image texture database (DB) 260.

Then, a texture comparison unit 270 performs the browsing or sorting process by comparing the texture values of data images close to each other by using the texture of the query image 240 as a standard. Therefore, the internal properties of images can be browsed without directly examining individual image data, wherein the internal properties represent color, nature and objects in the images.

Figure 3:
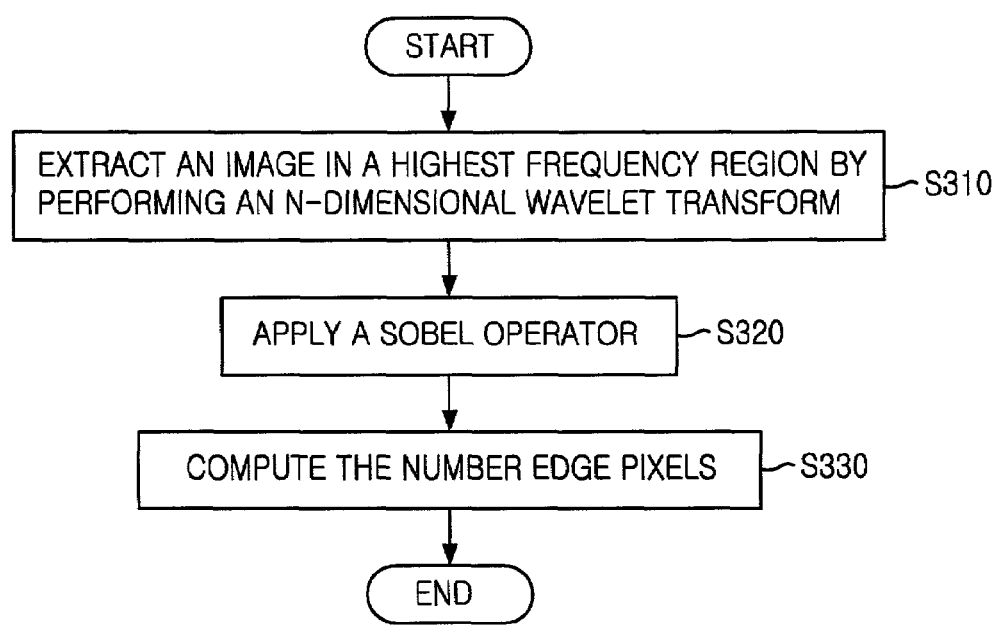
FIG. 3 is a flow chart of sequentially representing the image database sorting method in accordance with the present invention.

Referring to FIG. 3, there is provided a flow chart of sequentially showing an operation of a data image texture measuring unit 220 in FIG. 2 in accordance with the present invention. Through the operational sequence, the texture of the data image is measured.

In step S310, an original image (static image) in the data image DB is transformed through a Wavelet transform process to thereby extract an image in a highest frequency region which emphasizes a specific feature point included in the original image.

At this time, the reason that the image in the highest frequency region is extracted through the Wavelet transform process is that a high frequency part represents edge information of objects in the original image and a low frequency part shows information for internal regions of the objects. Therefore, the low frequency part can be used in an image compression process.

Then, since the extracted image in the highest frequency region not only includes the edge information of the original image but also noises therein, an image only including the edge information is obtained by eliminating the noises through the use of a Sobel operator in step S320.

In step S330, the number of edge pixels in the extracted image is computed and the texture of the original image is obtained by numerating the number of edge pixels determined through the Sobel operator.

That is to say, if the number of edge pixels of an image A is 10 and that of an image B 20, it means that the coarseness of the image B is twice as much as that of the image A.

The Wavelet transform used in the present invention is a technique which can resolve the data and functions in the original image into frequency components different from each other and make to examine results corresponding to each frequency and components associated there to. Furthermore, this wavelet transform function has various advantages required to the image compression, so that it can be used as a standard compression coding technique in MPEG-4.

The Sobel operator used in the present invention is a kind of operator and is generally called a gradient operator. Through a mask operation, it finds a vertical and horizontal edge of an object as well as removing noises in images. It is defined as a matrix consisting of:

Vertical components: [−1,0,1:−2,0,2:−1,0,1]
Horizontal components: [−1,2,1:0,0,0:1,2,1]

Through the above matrix, the vertical and horizontal edge information of the original image is obtained by performing a product operation for the original image through the use of 3×3 mask.

Figure 4:
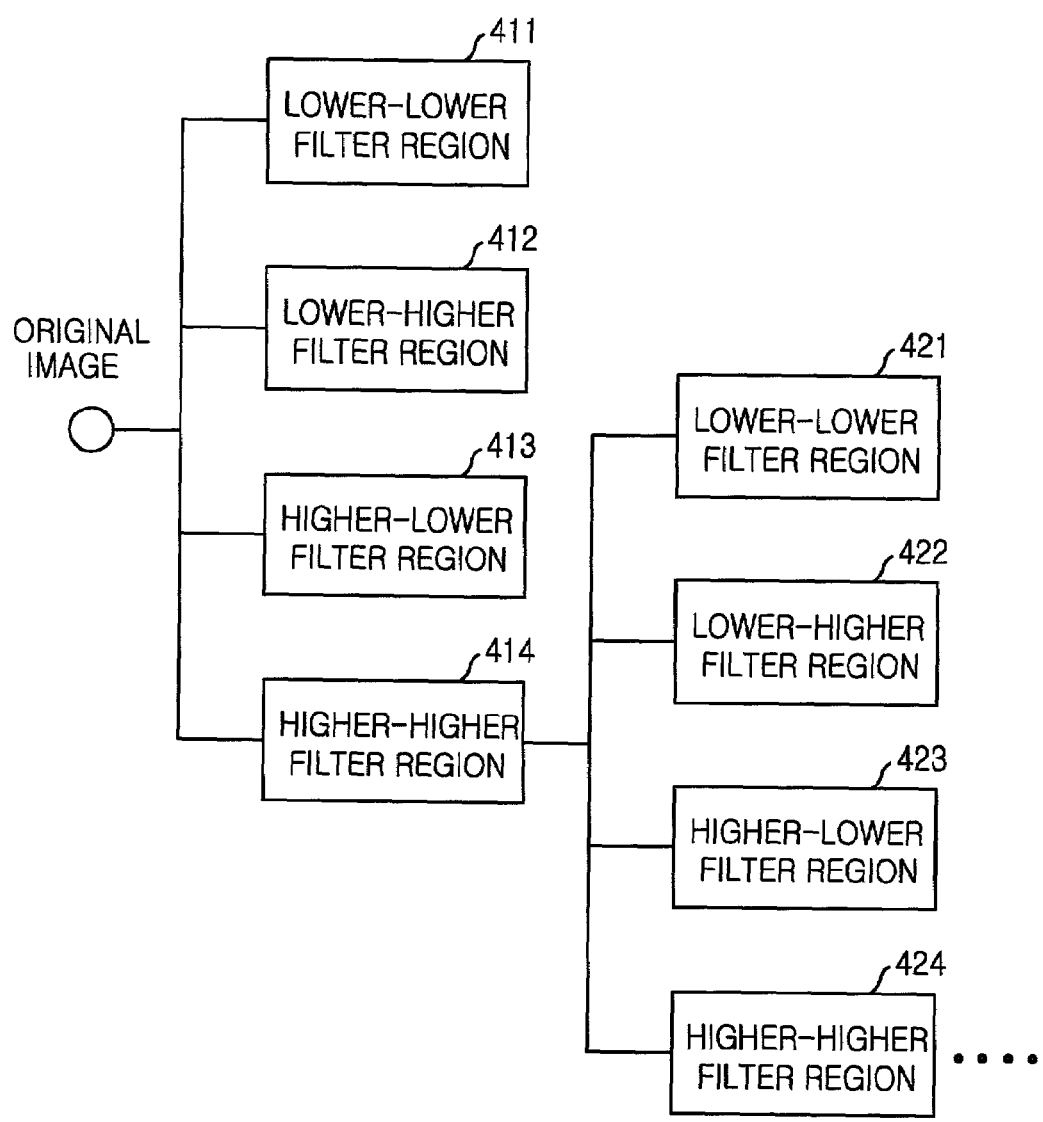
FIG. 4 provides a schematic diagram of describing a wavelet transform process shown in FIG. 3.

The Wavelet transform technique including above features is noticeable with reference to a drawing. Referring to FIG. 4, there is provided a schematic diagram of describing a wavelet transform process implemented in the present invention.

As illustrated in FIG. 4, the present invention executes an n-dimensional wavelet transform using a high pass filter so as to acquire edge information of objects in the static image.

In accordance with the present invention, the Wavelet transform process is accomplished as dividing 4 frequency regions 411, 412, 413 and 414. Herein, a higher-lower filter region 413 represents a high frequency region to a low frequency region.

As before-mentioned, since the high frequency region provides the edge information of the objects in the static image, it is possible to perform the n-dimensional Wavelet transform process by using the high frequency filter until developers obtain desired images or edge information.

As described above, since the present invention measures texture of static images by numerating the number of edge pixels of objects in the static images, wherein the number of edge pixels is computed by utilizing the Wavelet transform and the Sobel operator, and sorts the measured textures in a corresponding image DB according to a sorting order, the present invention can accomplish fast and effective browsing based on contents of images and this technique is applicable to the broadcasting data searching and filtering which uses image data in a large amount.

While the present invention has been described with respect to the particular embodiments, it will be apparent to those skilled in the art that various changes and modifications may be made without departing from the spirit and scope of the invention as defined in the following claims.

What is claimed is:

1. A computer implemented method for browsing static image in a data image texture database by using an inputted query image as a standard, comprising:
   measuring a texture of the query image by counting a number of edge pixels of an object in the query image and representing the measured texture of the query image with a numeric value indicating the counted number of edge pixels;
   searching static images having texture numeric values close to the numeric value representing the measured texture of the query image among the static images in the data image texture database; and
   storing the static images in an order of texture values closest to the numeric value representing the measured texture of the query image;
   wherein the measuring further includes:
      performing an n-dimensional Wavelet transform by using a high pass filter so as to obtain transformed static images;
      performing a Soble operator to substantially eliminate noises included in the transformed static images; and
      counting a number of edge pixels of each of a plurality of static images and representing a measured texture of each of the plurality of static images with a numeric value indicating the counted number of edge pixels.

* * * * *